(12) United States Patent
Park

(10) Patent No.: US 7,409,923 B2
(45) Date of Patent: Aug. 12, 2008

(54) PET FOOD STORAGE AND FEEDER DEVICE

(76) Inventor: Sung Ho Park, 14730 Willow Creek Rd., Chino Hills, CA (US) 91709-4733

( * ) Notice: Subject to any disclaimer, the term of this patent is extended or adjusted under 35 U.S.C. 154(b) by 132 days.

(21) Appl. No.: 11/316,650

(22) Filed: Dec. 21, 2005

(65) Prior Publication Data

US 2007/0137586 A1 Jun. 21, 2007

(51) Int. Cl.
*A01K 5/00* (2006.01)
(52) U.S. Cl. .................................................. 119/61.53
(58) Field of Classification Search ................ 119/51.5, 119/52.1, 57.1, 57.92, 61.53, 72, 74
See application file for complete search history.

(56) References Cited

U.S. PATENT DOCUMENTS

| | | | |
|---|---|---|---|
| 1,274,548 A | 8/1918 | Holnagel et al. | |
| 3,340,851 A | 9/1967 | Frank et al. | |
| 3,730,141 A | 5/1973 | Manning et al. | |
| 3,985,104 A | 10/1976 | Klemer | |
| 4,079,699 A | 3/1978 | Longmore et al. | |
| 4,450,790 A * | 5/1984 | Stansbury, Jr. ........... | 119/51.12 |
| 4,665,862 A | 5/1987 | Pitchford, Jr. et al. | |
| 4,735,171 A | 4/1988 | Essex | |
| 4,896,627 A | 1/1990 | Riddell | |
| 5,199,381 A | 4/1993 | Masopust | |
| 5,363,805 A | 11/1994 | Wing | |
| 5,433,171 A | 7/1995 | Ewell | |
| 5,588,394 A | 12/1996 | Balistreri | |
| 5,730,082 A | 3/1998 | Newman | |
| 5,857,428 A | 1/1999 | Gitzen | |
| 6,135,056 A | 10/2000 | Kuo | |
| 6,142,099 A | 11/2000 | Lange, Jr. | |
| 6,401,657 B1 | 6/2002 | Krishnamurthy | |
| 6,622,656 B1 | 9/2003 | Splane | |
| 6,701,866 B1 | 3/2004 | Shieh | |
| 6,863,025 B2 | 3/2005 | Ness | |
| 2003/0106498 A1 | 6/2003 | Mersits et al. | |
| 2005/0011465 A1 | 1/2005 | Park | |

FOREIGN PATENT DOCUMENTS

| | | |
|---|---|---|
| DE | 3112743 A1 | 10/1982 |
| DE | 297 14072 U1 | 11/1997 |
| FR | 2 599 722 A1 | 12/1987 |

* cited by examiner

*Primary Examiner*—T. Nguyen
(74) *Attorney, Agent, or Firm*—Christie, Parker & Hale, LLP.

(57) ABSTRACT

A pet food storage and feeder device having a food storage container positioned above a base for containing water by legs extending between the food storage container and the base and a barrier wall positioned around the legs to create a water barrier between the base and the food storage container. Separate food and water bowls are attached to an exterior surface of the base.

12 Claims, 4 Drawing Sheets

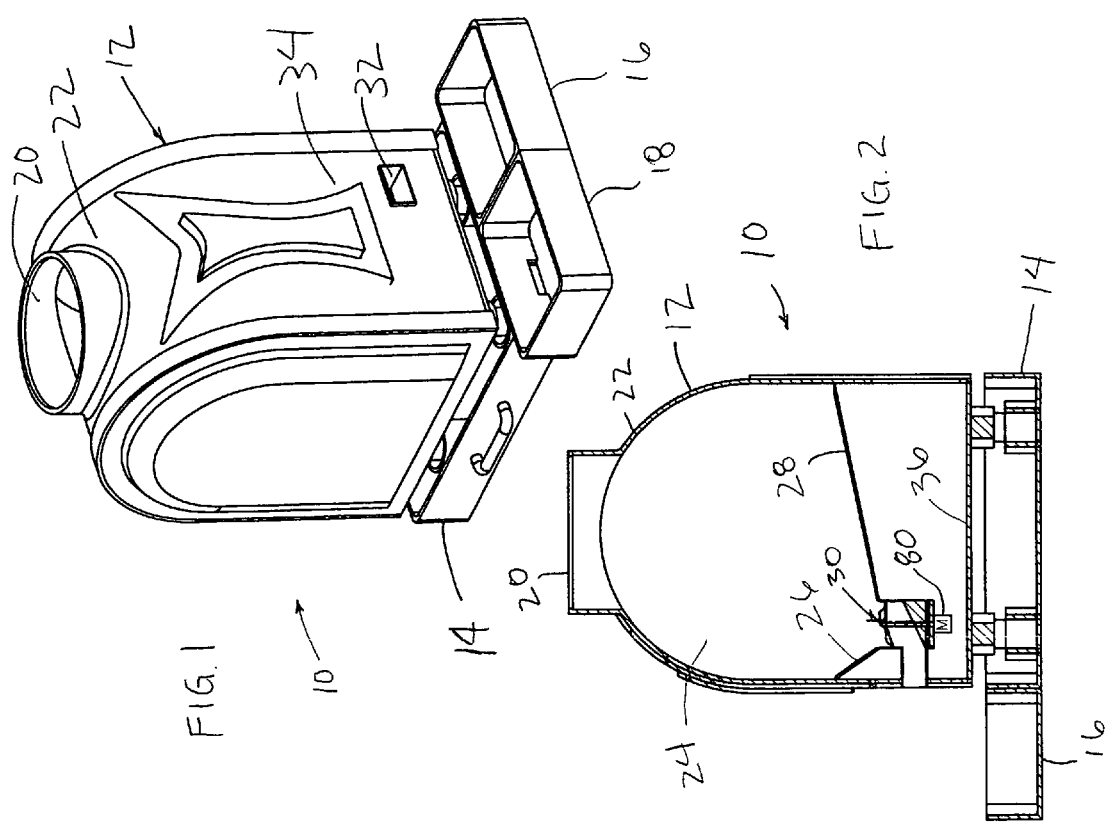

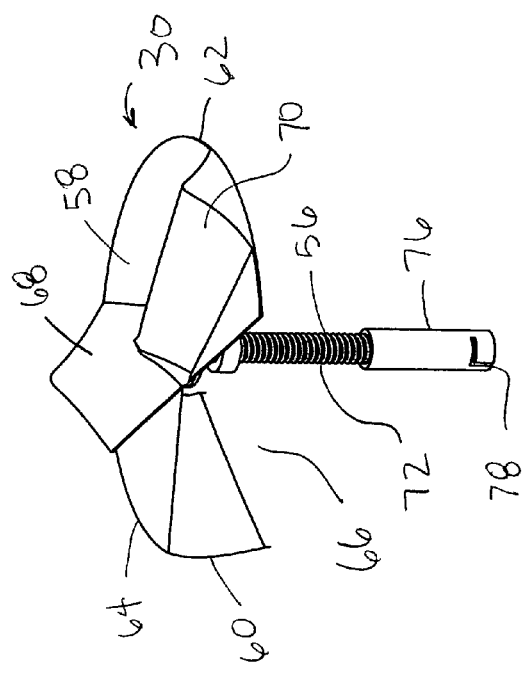
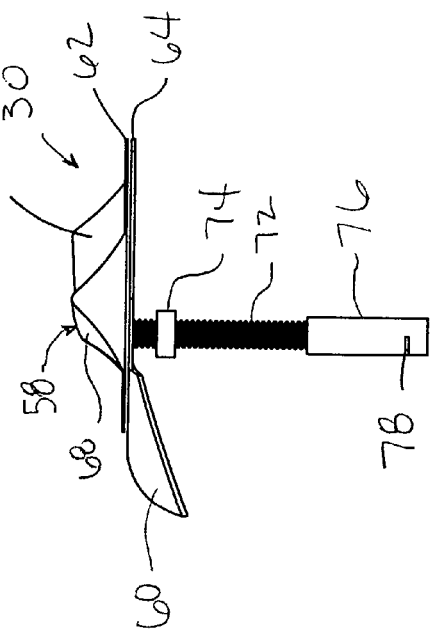

PET FOOD STORAGE AND FEEDER DEVICE

BACKGROUND OF THE INVENTION

The present invention relates to an improved pet food storage and feeder device, and more particularly to a pet food storage and dispensing device that will automatically feed a pet and protect the stored food from ant or other insect infestation. The pet food storage and feeder device prevents ant or other insect infestation by providing a water barrier between the ground and a food storage container.

Pet food storage and dispensing devices are widely used to feed pets and animals, especially when the pet owner is away from the pet for a period of time. The diet of pets and animals is important to their health. In order to control the diet, quantity and timeliness of feeding should be considered. Automatic pet food dispensing devices allow pets to be fed regularly and in controlled amounts. Difficulty for pet owners to regularly feed their pets occurs when the owner is not available to be home during feeding times, or when the pet keeper is away for an extended period of time which requires the pet to be with a sitter or at a kennel. In these situations, misfeeding can occur or the animal can be fed at different and multiple times by various members of the owners family.

To remedy these situations, previous pet food dispensers have been designed to store and automatically feed pets. Problems with prior food storage and feeder devices is that dry food can jam or crush in the storage device where the pet food enters a dispenser due to mechanical components or restricted areas of the dispenser. Another problem with prior pet food storage and feeder devices is that because they sit on the ground, they can be infested with ants or other pests gaining access to the food by climbing up and into the storage container. Consequently, a need exists to provide an improved pet food storage and feeder device which overcomes the problems of prior devices to accurately and automatically feed the pet and to protect the stored food from ant or other insect infestation.

SUMMARY OF THE INVENTION

The present invention provides an improved pet food storage and feeding device that solves the problems of prior food storage and feeder devices. The pet food storage and feeder device of the present invention includes a storage container positioned above a base for containing water. The storage container includes legs which extend into receptacles in the base, such that the container is elevated above the base. Separate food and water bowls are positioned adjacent the base such that water can flow from the base into the water bowl for the pet. Pet food contained within the container is dispensed through a chute into the food bowl. Located inside the container is a dispensing device that prevents jamming of the feeder by the pet food. The pet food dispenser includes a shaft, a dispensing disc, and a stir for stirring jammed pet food particles.

The dispensing disc includes a top layer and a bottom layer. The top and bottom layers of the dispensing discs are positioned adjacent one another. The top layer comprises a top cut out portion and the bottom layer comprises a bottom cut out portion. The area of opening formed by the top and bottom cut out portions is adjustable. The top layer of the dispensing disc includes one or more bumps on the top surface to facilitate flow of the pet food out of the container.

The stir of the pet food dispenser includes a first flap extended from a first edge of the bottom layer of the dispensing disc, and the flap is bent downwardly below a horizontal plane. The top and bottom layers of the dispenser have a substantially semi-circular shape, each layer including a first edge and a second edge. The angle of the arc recess defined by the second edge of the top layer and the first edge of the bottom layer varies from zero to 180 degrees. The stir is preferably made of a flexible material.

The shaft of the pet food dispenser includes a cylinder portion, a stopper ring portion, and a connecting cylinder portion. The shaft is securely fixed to the top layer of the dispensing disc and engaged with the bottom layer of the dispensing disc by friction. The stopper ring portion is positioned along the cylinder portion at a predetermined location to keep the top and bottom layers of the dispensing disc at the predetermined position. The connecting cylinder portion comprises a first end, a second end, and is fixed with the cylinder portion. The connecting cylinder portion includes an inverted-L shaped slit at the second end. The second end of the connecting cylinder portion is engaged with a motor driving device. The cylinder portion includes external threads and a stopper ring portion and the connecting cylinder portion includes internal threads matching with the external threads of the cylinder portion.

The second edge of the top layer of the dispending disc may include a second flap bent downwardly below the horizontal plane to provide additional stirring of the pet food. Other details of the dispensing device are disclosed in Applicant's pending U.S. patent application Ser. No. 11/062,918, filed Feb. 22, 2005, the disclosure is incorporated by reference herein.

The receptacles in the base for receipt of the feet on the floor of the food container, includes an outer portion and an inner portion. The wall of the outer portion is shorter than the wall of the inner portion so that when the base is filled with water, the water fills the gap between the walls of the inner portion and the outer portion of the receptacle. Consequently, when the water in the base is depleted by the animal drinking from the water bowl, a water barrier still exists in the receptacle in the base preventing ants or insects from accessing the food in the storage container.

Another advantage of the present invention is that the food and water bowls are on the outside of the base, thereby giving easy access to food and water by the animal and preventing dry food from being dispensed into the water in the base, thereby preventing the food from becoming soggy.

The pet food storage and dispending device of the present invention has a power supply that supplies power to a motor, a timer, a switch and a display. The timer controls the operation time of the motor and the switch sets the timer, while the display displays parameters for setting the timer.

Other advantages of the present invention are that the pet food storage and dispensing device prevents food from jamming or crushing in the feeder, provides easy separation of the parts of the feeder for ease of use and ease of cleaning, provides timely feeding of the pet of a predetermined quantity of pet food and prevents ants or other pests from reaching the pet food.

Although the present invention is briefly summarized, the above advantages, as well as others will become apparent upon reference to the following detailed description, accompanying drawings and appended claims.

BRIEF DESCRIPTION OF THE DRAWINGS

These and other features, aspects and advantages of the present invention will become better understood with reference to the accompanying drawings, wherein:

FIG. 1 is a front perspective view of the pet food storage and feeder device of the present invention;

FIG. 2 is a cross sectional view of the pet food storage and feeder device of FIG. 1;

FIG. 5 is a perspective view of the dispenser device of the pet food storage and feeder device of FIG. 1; and FIG. 6 is a front view of the dispenser of FIG. 5.

DETAILED DESCRIPTION OF THE DRAWINGS

Figure 3:
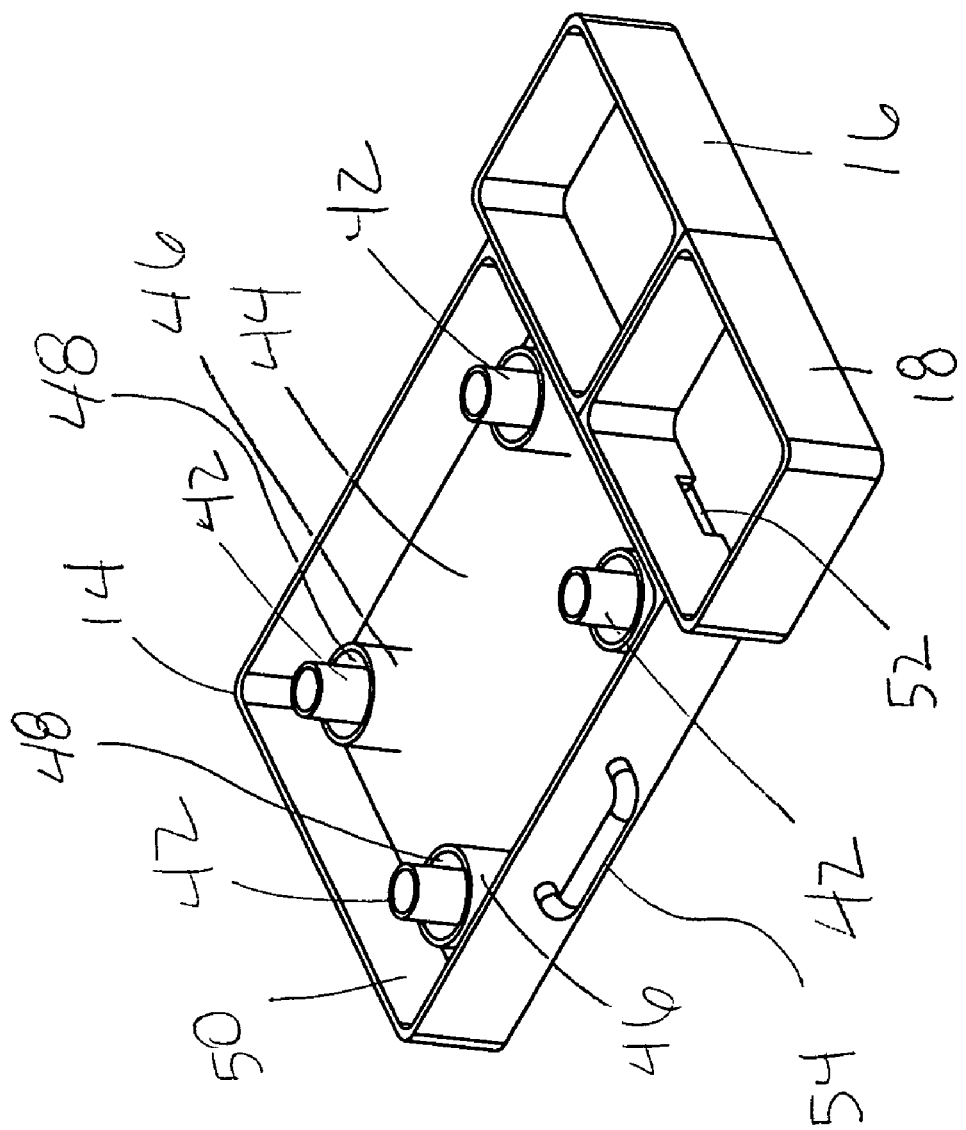
FIG. 3 is a perspective view of the base of the pet food storage and feeder device of FIG. 1.

FIGS. 1 through 6 illustrate an improved pet food storage and feeder device 10 of the present invention. The device 10 includes a pet food storage container 12 suspended above a base 14 and a food bowl 16 and a water bowl 18 attached to an outer surface of the base 14. The food storage container 12 has an opening 20 on a top surface 22 to fill the container 12 with pet food (not shown) within an internal cavity 24 of the container. The storage container 12, although shown as a square container having a semi-circular top surface, can be of any geometrical configuration within the knowledge of one ordinarily skilled in the art. Located within the cavity 24 are sloping surfaces 26 and 28 which aid in movement of the pet food toward the dispensing device 30. Sloping surfaces 26 and 28 act as a funnel which in conjunction with the dispenser 30 dispenses pet food out of chute 32 located on the front surface 34 of the container device and into the food bowl 16. The dispenser will be discussed in more detail subsequently herein.

Figure 4:
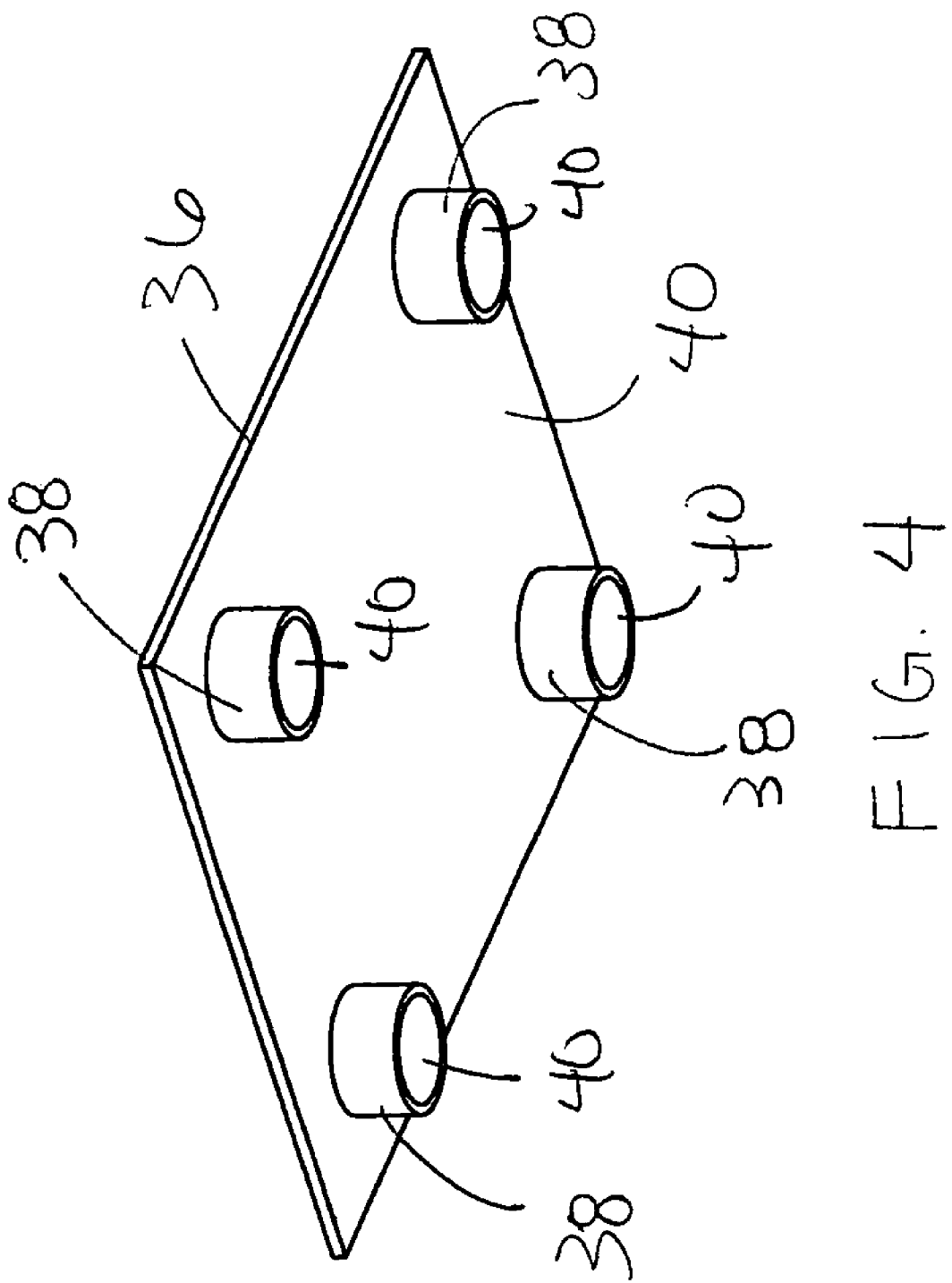
FIG. 4 is a perspective view of the floor of the storage container of the pet food storage and feeder device of FIG. 1.

As seen best in FIG. 4, storage container 12 has a floor 36 having four cylindrical legs 38 extending downwardly from a bottom surface 40. Each leg 38, includes a cavity 40 for receipt of posts 42 as seen best in FIG. 3. Posts 42 extend upwardly from a bottom surface 44 of base 14. The posts 42 extend into the cavity 40 of cylindrical legs 38 to support the container in an elevated position above the base 14. A larger diameter outer wall 46 extends upwardly from floor 44 around each post 42. Outer wall 46 has a larger diameter than post 42 to create a reservoir 48 between the outer wall 46 and post 42. Outer wall 46 has a height which is lower than the height of vertical side walls 50 of the base so that when the base is filled with water, the reservoir 48 also is filled.

Food bowl 16 and water bowl 18 are removably attached to an outside surface of the perimeter wall 50 of the base 14 and an opening 52 extends through the perimeter wall of the water bowl and the perimeter wall 50 of the base so that water contained within the base enters the water bowl. Water is manually poured into the base to provide a water barrier between the base and the food container to prevent ants or other pests from entering into the food container. Water contained within the reservoir 48 remains in the reservoir even if the water in the base is depleted by an animal drinking all of the water from the water bowl to thereby ensure a water barrier against ants or other pests. Handles 54 are positioned on opposite perimeter side walls of the base to facilitate carrying of the device.

As also shown in FIGS. 5 and 6, the pet food dispenser 30 includes a shaft 56 attached to a dispensing disc 58 and a stir 60. The dispenser 30 facilitates movement of the pet food from the cavity in the storage container and out of chute 32. The dispensing disc 58 includes a top layer 62 and an adjacent bottom layer 64. The top and bottom layers are substantially semi-circular and define a cut out area 66. The size of the cut out area 66 can be varied depending upon the particular food being dispensed. The top layer 62 includes one or more undulations 68 and 70 for movement of the pet food. The stir 60 is a flexible flap bent downwardly which also facilitates movement of pet food to prevent jamming or crushing as it exits the chute 32. The shaft 56 of the dispenser 30 includes a threaded portion 72 upon which is located a stopper ring 74 and an unthreaded cylindrical portion 76. The shaft 56 is rigidly secured to the top layer 62 and frictionally engages the bottom layer 64. The stopper ring 74 is positioned at a predetermined location to maintain the dispensing disc at its predetermined position. The connecting cylinder portion 76 includes an inverted-L shaped slit 78 used to facilitate attachment to the driving device or motor 80 (shown in FIG. 1). Further details of the dispenser mechanism 30 are discussed in detail in Applicant's co-pending application Ser. No. 11/062,918, the disclosure of which is incorporated herein by reference.

The motor 80 is preferably an electrical motor which can be powered by a battery or from a wall outlet. The motor is driven automatically and includes a timer, a switch and a display to control the operation time of the motor by programming the timer. A power switch (not shown) would be included to facilitate operation of the motor. Programmable buttons would also be positioned on the container to control frequency and quantity of food dispensed into the food bowl. For example, the power switch could trigger either the motor or a timer which is electrically connected to the motor and to a display. The display shows the time that has been set for the automatic pet food dispensing device to turn on. The power supply supplies power to the motor and the timer and the power supply is energized by either a battery or a wall outlet.

In use, initially the base is filled with water up to the edge of the perimeter wall. Water will then flow into the water bowl. Pet food is placed within the storage container through the opening and the opening is then covered with a cap (not shown). The container is then placed upon the base such that the legs engage the post in the base. The feeder is then programmed such that at the designated time, the motor operates the feeder thereby dispensing food into the food bowl. The pet food storage and feeder device automatically feeds the pet without jamming or crushing of the food and maintains the food in an uncontaminated condition from ants or other pests by providing a water barrier for the stored food. The food and water bowls are positioned on the exterior of the device to prevent the dry food from becoming accidentally moistened by the water contained in the base. The device of the present invention is easily disassembled for cleaning and refilling.

Although the present invention has been shown and described with respect to a specific embodiment thereof, it is to be understood that modifications can be made therein which are within the scope of the invention as defined by the claims herein.

What is claimed is:

1. A pet food storage and feeder device comprising:
   a food storage container;
   a base containing water, the base having a vertical perimeter wall;
   means for suspending the food storage container above the perimeter wall of the base;
   a food bowl and a water bowl attached to an exterior surface of the perimeter wall of the base, the food bowl receiving food from the food storage container and the water bowl receiving water from the base;
   wherein the means for suspending the food storage container above the perimeter wall of the base includes a plurality of legs on a lower surface of a floor of the food storage container;

wherein each leg is received on a post positioned on a bottom surface of the base; and wherein an outer barrier wall is spaced around the post to form a water barrier around the post irrespective of a water level in the base.

2. The device of claim 1, wherein the base and the water bowl each have an opening for flow of water from the base into the water bowl.

3. The device of claim 1, wherein the storage container includes a food dispenser located in a cavity of the container.

4. The device of claim 3, wherein the dispenser is automatically operated by a motor.

5. The device of claim 3, wherein the cavity of the container includes sloping surfaces which direct food located in the container toward the dispenser.

6. The device of claim 3, wherein the food storage container includes a chute for passage of food from the food storage container by the dispenser into the food bowl.

7. A pet food feeder comprising:
a food storage container for dry pet food;
a base containing water;
means for providing a water barrier between the food storage container and the base, even when the base has otherwise been depleted of water;
a food bowl and water bowl attached to the base;
means for suspending the food storage container above the base;
wherein the means for suspending the food storage container above the base includes a plurality of legs on a lower surface of a floor of the food storage container;
wherein each leg is received on a post position on a bottom surface of the base; and
wherein the means for providing a water barrier between the food storage container and the base is a barrier wall spaced around the post and forming a cavity for receipt of water.

8. The feeder of claim 7, wherein the base and the water bowl each have an opening for flow of water from the base into the water bowl.

9. The feeder of claim 7, wherein the food storage container includes a food dispenser located in a cavity of the container.

10. The feeder of claim 9, wherein the dispenser is automatically operated by a motor.

11. The feeder of claim 9, wherein the cavity of the container includes sloping surfaces.

12. The feeder of claim 9, wherein the food storage container includes a chute for passage of food from the container via the dispenser into the food bowl.

* * * * *